US006691503B2

United States Patent
Tiemann

(10) Patent No.: US 6,691,503 B2
(45) Date of Patent: Feb. 17, 2004

(54) GAS TURBINE HAVING FIRST AND SECOND COMBUSTION CHAMBERS AND COOLING SYSTEM

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/104,083

(22) Filed: Mar. 21, 2002

(65) Prior Publication Data

US 2002/0148214 A1 Oct. 17, 2002

(30) Foreign Application Priority Data

Mar. 26, 2001 (EP) .............................. 01107386

(51) Int. Cl.[7] ................................. F02C 3/00
(52) U.S. Cl. ................ 60/39.17; 60/39.15; 60/752; 60/760; 60/806
(58) Field of Search .................. 60/39.17, 806, 60/752, 760, 39.15, 791, 792

(56) References Cited

U.S. PATENT DOCUMENTS

| | | | | |
|---|---|---|---|---|
| 2,584,899 A | * | 2/1952 | McLeod ........................ | 60/806 |
| 2,625,793 A | * | 1/1953 | Mierley et al. ................ | 60/806 |
| 3,315,467 A | | 4/1967 | De Witt | |
| 3,703,808 A | * | 11/1972 | Stearns ........................ | 415/115 |
| 3,973,396 A | * | 8/1976 | Kronogard ..................... | 60/806 |
| 4,214,436 A | * | 7/1980 | Romeyke et al. ............. | 60/39.17 |
| 4,249,371 A | * | 2/1981 | Romeyke ...................... | 60/39.17 |
| 5,083,422 A | | 1/1992 | Vogt | |
| 5,363,642 A | * | 11/1994 | Frutschi et al. .............. | 60/39.17 |
| 5,680,767 A | * | 10/1997 | Lee et al. ...................... | 60/760 |
| 5,768,893 A | | 6/1998 | Hoshino et al. | |
| 5,782,076 A | * | 7/1998 | Huber et al. .................. | 60/760 |

FOREIGN PATENT DOCUMENTS

| | | |
|---|---|---|
| EP | 0595026 | 4/1994 |
| EP | 1 028 237 | 8/2000 |
| GB | 513151 | 10/1939 |
| GB | 2 236 145 | 3/1991 |

* cited by examiner

*Primary Examiner*—Ted Kim

(57) ABSTRACT

A gas turbine (5) according to the invention, which comprises a main combustion chamber (10), a cooling system for air cooling of at least the guide vanes (26, 29) and guide rings (28, 38) of various stages (25, 27) of the gas turbine (5), and a main gas passage, also includes a further combustion chamber (34), which is arranged downstream of the main combustion chamber (10) as seen in the hot-gas main direction (H). The cooling air (15) used to cool a stage (25) of the gas turbine which is arranged upstream of the further combustion chamber (34) is fed into this further combustion chamber (34). In this context, it is particularly advantageous for the cooling air (15) used to cool the various stages (25, 27) of the gas turbine (5) to be fed for combustion. This makes it possible, inter alia, to increase the output of the gas turbine (5) without having to increase the supply of fuel.

8 Claims, 1 Drawing Sheet

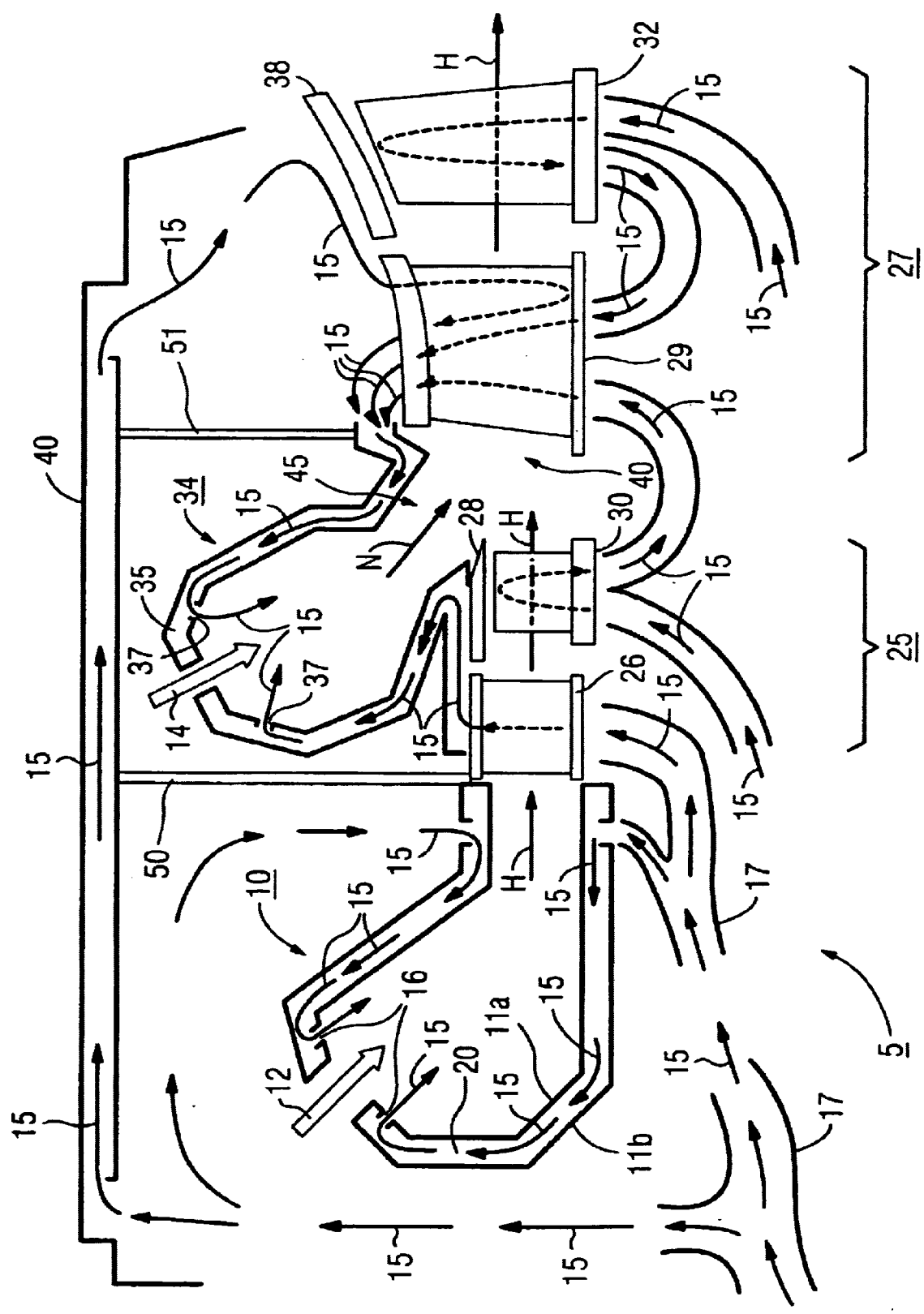

GAS TURBINE HAVING FIRST AND SECOND COMBUSTION CHAMBERS AND COOLING SYSTEM

CROSS-REFERENCE TO RELATED APPLICATIONS

This application claims priority to EP/01107386.3, filed Mar. 26, 2001 under the European Patent Convention and which is incorporated by reference herein in its entirety.

FIELD OF THE INVENTION

The invention relates to a gas turbine which comprises a combustion chamber, a cooling system for air cooling of at least the guide vanes and guide rings of various stages of the gas turbine, and a main gas passage.

BACKGROUND OF THE INVENTION

U.S. Pat. No. 5,083,422 has described a gas turbine for an aircraft engine. This gas turbine has a combustion chamber to which cooling air, which has been compressed by a compressor and is largely consumed for combustion by the burners arranged in the combustion chamber, is fed. A further part of this cooling air is used to cool that side of the inner wall of the combustion chamber which is remote from the interior of the combustion chamber. In the regions in which burners are arranged in the combustion chamber, the inner wall of the combustion chamber is surrounded by a shell which has holes for cooling air to flow in. The inner wall itself is designed to be air-impermeable in these regions.

This further part of the cooling air passes through the holes in said shell of the inner wall and, in this way, cools that side of the inner wall which is remote from the interior of the combustion chamber. The inner wall also has an opening through which the cooling air which has entered through the holes in the shell is fed to the interior, so that it can mix with the hot gas flowing in the interior. This ensures that the air which is used to cool the combustion chamber wall can then be utilized for combustion. In this way, a total quantity of air which is available both for the cooling of the combustion chamber wall and for the combustion is utilized more fully with regard to the output which can be generated by the gas turbine, since the cooling air is not "lost" to the combustion. In addition to the combustion chamber wall, in a gas turbine it is generally also necessary for at least the guide vanes and the guide rings to be cooled in operation. For this purpose, it is also customary to use cooling air which flows through and/or passes over said components. The abovementioned document does not describe supplying this cooling air for combustion.

This cooling air cannot readily be utilized for combustion, since, over its cooling path, it loses too much pressure for it to be able to be returned to the combustion chamber in order to enhance combustion therein.

The abovementioned prior art does not provide any possible solutions which could allow the cooling air which is used to cool at least the guide vanes and the guide rings also to be utilized for combustion.

The invention is therefore based on the object of making better use of the total amount of air available in a multistage gas turbine. A further object of the invention is to improve the output of the gas turbine by simple means. A further object of the invention is to reduce the emissions of pollutants on the gas turbine.

Said objects are achieved by a gas turbine which comprises a main combustion chamber, a cooling system for the air cooling of at least the guide vanes and/or guide rings of various stages of the gas turbine and a main gas passage, in which turbine a further combustion chamber is arranged downstream of the main combustion chamber, as seen in the hot-gas main direction, into which the cooling air used to cool a stage of the gas turbine which is arranged upstream of the further combustion chamber is fed.

Gas turbines, in particular gas turbines for generating electrical energy, generally include a plurality of stages formed by guide vanes and rotor blades, in order to extract the energy contained in the hot gas in steps, so that it can be optimally converted into rotational energy, which is then, when the turbine is used in power generation, converted into electrical energy by a generator connected downstream of the turbine.

When the hot gas passes through a stage of the gas turbine, the hot gas releases only part of its energy to the rotor blades belonging to this stage, so that after the hot gas has passed through this stage there is still energy available which can be converted into rotational energy. Therefore, in known gas turbines a plurality of stages are connected in series, in order to allow optimum utilization of the energy of the hot gas. By way of example, a gas turbine may include three stages, for example a high-pressure stage, a medium-pressure stage and a low-pressure stage. The guide vanes, rotor blades and guide rings of each stage are adapted in terms of their structure and design to the pressure conditions prevailing in the respective stage. To prevent excessive thermal loads on these components, at least the guide vanes and/or guide rings of each stage are cooled with the aid of cooling air. To ensure that this cooling air is not lost to the combustion, there is provision, according to the invention, for this cooling air to be used for combustion in a further combustion chamber which is arranged downstream of the main combustion chamber, as seen in the hot-gas direction.

The hot gas which is generated in this further combustion chamber is then fed to a subsequent stage of the gas turbine.

In this way, according to the invention the cooling air which is used to cool one stage of the gas turbine is used for combustion in a further combustion chamber, so that as much of the total amount of air fed in as possible is utilized for combustion.

This increases the output of a multistage turbine, since the cooling air used to cool one turbine stage is utilized for combustion in a further combustion chamber and therefore additional energy is available to drive a subsequent turbine stage without the air supply system to the turbine having to be made larger.

Furthermore, it is possible, in the present invention, for the fuel which was hitherto already required to be divided between the two combustion chambers. Therefore, to increase the output, the supply of fuel does not have to be increased. If the supply of fuel were to be increased, the temperature-dependent pollutant emissions, for example of nitrogen oxides, would rise. Therefore, the invention achieves an increase in output without it being necessary to accept increased emissions of pollutants.

Furthermore, the blades and vanes of the turbine are not subjected to increased thermal loads despite the increased output achieved, since there is no increased supply of fuel in order to increase the output; such an increase in fuel would lead to a rise in the operating temperature and therefore to the thermal load on the stages of the gas turbine.

In an advantageous configuration of the invention, the further combustion chamber, as seen in the hot-gas main direction, opens out into the main gas passage downstream of a gas-turbine stage arranged upstream of it and upstream of a gas-turbine stage arranged downstream of it.

The hot gas which has flowed through a stage of the gas turbine which is arranged upstream of the further combustion chamber becomes mixed with the hot gas which has been generated in the further combustion chamber before flowing through a stage of the gas turbine which is arranged downstream of the further combustion chamber. This mixed flow is, for example, practically homogeneous with regard to the temperature and pressure distribution prevailing therein, so that the guide vanes and rotor blades and the guide rings of the downstream stage are uniformly loaded.

It is advantageous for the further combustion chamber to have a closed cooling system, into which the cooling air used to cool a stage of the gas turbine which is arranged upstream of it is fed. A cooling system of this type for the further combustion chamber may be formed, for example, by surrounding the inner wall of the further combustion chamber by an outer wall, so that a space, which is used as a cooling-air passage in the closed cooling-air system, is formed between the inner and outer walls of the further combustion chamber.

Cooling air which has flowed through or passed over components, for example a guide vane and/or a guide ring, of a stage of the gas turbine arranged upstream of the further combustion chamber is then fed into the closed cooling-air passage of the further combustion chamber. In the process, this cooling air cools the outer side of the combustion-chamber inner wall of the further combustion chamber by passing along its outer side.

The cooling air from the closed cooling-air system passes into the combustion space of the further combustion chamber through at least one opening in the inner wall and is then mixed with an air stream which is generated by a compressor and fed to the further combustion chamber and is fed for combustion.

The closed cooling system of the further combustion chamber offers the advantage that, during the cooling of the outer side of the inner wall of said further combustion chamber, no air is lost which could then no longer be utilized for combustion in the further combustion chamber. In this way, the efficiency of the further combustion chamber is improved.

In a further advantageous configuration of the convention, the cooling air which is used to cool a stage of the gas turbine which is arranged downstream of the further combustion chamber, as seen in the hot-gas main direction, is additionally fed into the closed cooling system.

The important components of each stage of a gas turbine, such as for example the guide vanes and the guide rings, have to be protected against excessive thermal loads and therefore cooled in operation. In order for the cooling air which is used to cool a stage of the gas turbine arranged downstream of the further combustion chamber also to be used for combustion in the further combustion chamber, this cooling air is likewise fed into the closed cooling system of the further combustion chamber and then utilized for combustion in the further combustion chamber.

In this way, the efficiency of the further combustion chamber rises.

It is advantageous for the stage of the gas turbine which is arranged downstream of the further combustion chamber to be supplied with cooling air by means of an overflow line which is in communication with the stage arranged upstream of the further combustion chamber. This ensures that the cooling air which is used to cool the two said stages is under practically the same pressure conditions in the regions of both stages. In this way, respective fractions of the cooling air which have in each case been used to cool one of said stages promote combustion in the further combustion chamber in practically the same proportions.

In the event of a pressure difference which is not merely insignificant between the two said cooling-air streams, one of the two streams would under certain circumstances force back the other, so that the latter cannot be utilized or can only partially be utilized for combustion in the further combustion chamber. This refinement of the invention therefore contributes to further increasing the efficiency of combustion.

It is advantageous for the further combustion chamber to be arranged between two partition walls 50,51 which separate the further combustion chamber from adjoining regions of the turbine in which gas pressure which has been generated by compressors prevails.

On account of the different pressure conditions which prevail in the regions of the stages of the gas turbine which are arranged upstream and downstream of the further combustion chamber compared to the region of the further combustion chamber, the cooling air preferentially flows out of regions in which the abovementioned stages of the turbine are arranged into the region in which the further combustion chamber is arranged; the partition walls ensure that the pressure between said regions does not balance itself out, and therefore a pressure gradient is maintained.

BRIEF DESCRIPTION OF THE DRAWINGS

An exemplary embodiment of the invention is described below. In the drawing:

The FIGURE shows a combustion-chamber arrangement of a gas turbine according to the invention.

DETAILED DESCRIPTION OF THE PREFERRED EMBODIMENT

The gas turbine 5 comprises a main combustion chamber 10, the combustion-chamber interior of which is enclosed by a combustion-chamber inner wall 11a. On the outside, the main combustion chamber 10 is delimited by a combustion-chamber outer wall 11b, in such a manner that a cooling-air passage 20 is formed between the combustion-chamber inner wall 11a and the combustion-chamber outer wall 11b.

When the gas turbine 5 is operating, a compressor gas mixture 12, which has been generated by a compressor, is introduced into the main combustion chamber 10, where it is burnt, by burners which are not shown in more detail and are arranged in the main combustion chamber 10, to form a hot-gas mixture, which then successively drives the rotor blades 30 and 32 of the turbine stages 25 and 27, respectively.

Cooling air 15 is fed into the cooling-air passage 20 of the main combustion chamber 10 and cools the combustion-chamber inner wall 11a on its side which is remote from the main combustion chamber 10. The cooling air 15 is fed into the interior of the main combustion chamber 10 through openings 16, where it promotes combustion as an oxygen supplier. Moreover, the cooling air 15 is passed through the guide vane 26 of the turbine stage 25 by means of a diffuser 17 and thereby cools the guide vane 26. After it has emerged from the guide vane 26, the cooling air 15 is guided past a guide ring 28 in order to cool the latter.

A further combustion chamber 34 is arranged downstream of the main combustion chamber 10, as seen in the hot-gas main direction H.

The cooling air 15 is introduced into a cooling-air passage 35 of the further combustion chamber 34.

A compressor gas mixture 14 is fed to the further combustion chamber 34, where it is to be burnt by burners (not shown) to form an auxiliary hot-gas stream, which then emerges from the further combustion chamber 34 in the direction N.

The cooling air 15 in the cooling-air passage 35 of the further combustion chamber 34 is introduced into the interior of the further combustion chamber 34 through openings 37 and, in this interior, promotes combustion as an oxygen supplier.

The cooling air 15 is passed to a further turbine stage 27 via an overflow line 40. There, it is guided along a guide ring 38, thereby cooling the latter, and then enters a guide vane 29. The cooling air 15 then emerges on the same side of the guide vane 29 as the side at which it was introduced.

The cooling air 15 emerging from the guide vane 29 is fed into the cooling-air passage 35 of the further combustion chamber 35. Fractions of the cooling air 15 which, originating from the guide vane 29, have been fed into the cooling-air passage 35 pass through the openings 37 into the interior of the further combustion chamber 34, where they promote combustion.

In addition to the guiding of cooling air through the guide vanes which has been described, it is also possible, as shown in the current exemplary embodiment, for the cooling air 15 to be introduced into the rotor blades 30, 32 and to cool these blades. In this case, the cooling air 15 is reflected at the free end of the rotor blades 30, 32 and emerges on the same side of the respective rotor blade at which it entered. At the location where it emerges, it is then fed to the guide vane 29 by means of a passage, passes through the guide vane and is then fed into the cooling-air passage of the further combustion chamber 34. From there, it can enter the combustion space of the further combustion chamber through the outlet opening 37.

The further combustion chamber 34 opens out, by means of its auxiliary hot-gas passage 45, into the main hot-gas passage 40 downstream of the stage 25. There, the auxiliary hot-gas stream, which is flowing in direction N and has been generated by the further combustion chamber 34, mixes with the main hot-gas stream, which is flowing in direction H and has been generated by the combustion chamber 10.

This mixed flow passes through the guide vane 29 of the turbine stage 27 and drives the rotor blade 32 of the turbine stage 27.

In the exemplary embodiment of the invention which is illustrated in the figure, virtually all the cooling air 15 which is used to cool the turbine stages 25 and 27 is fed for combustion after the cooling operation. This results in particular in an increase in the output of the gas turbine, without the supply of fuel having to be increased. Furthermore, the thermal loads on the blades and vanes and the emission of pollutants, in particular the emission of nitrogen oxides, from the gas turbine are not increased, despite the increase in output. In many cases, a gas turbine according to the invention is even able to reduce the thermal loads on the blades and vanes and to reduce the levels of pollutant emissions.

What is claimed is:

1. A gas turbine, comprising a main combustion chamber, a cooling system for air cooling of at least one guide vane and guide ring of the gas turbine and/or a main gas passage, and a second combustion chamber arranged downstream of the main combustion chamber, the second combustion chamber adapted to accept cooling air to cool a stage of the gas turbine which is arranged upstream of the second combustion chamber, wherein the second combustion chamber has a closed cooling system into which the cooling air used to cool a stage of the gas turbine which is arranged upstream of the second combustion chamber is fed, wherein the cooling air which is used to cool a stage of the gas turbine which is arranged downstream of the second combustion chamber is additionally fed into the closed cooling system, and wherein the stage which is arranged downstream of the second combustion chamber is supplied with cooling air by an overflow line which is in communication with the stage arranged upstream of the second combustion chamber.

2. The gas turbine as claimed in claim 1, wherein the second combustion chamber opens into the main gas passage downstream of a stage arranged upstream of the second combustion chamber and upstream of a stage arranged downstream of the second combustion chamber.

3. The gas turbine as claimed in claim 1, wherein the second combustion chamber is arranged between partition walls which separate the second combustion chamber from adjoining regions of the turbine in which gas pressure which has been generated by compressors prevails.

4. A gas turbine adapted for use in a land based power generation system, comprising:
   a main combustion chamber;
   a plurality of stages, each stage having a plurality of guide vanes and guide rings;
   a cooling system for air cooling at least some of the guide vanes and guide rings and/or a main gas passage; and
   a second combustion chamber arranged downstream of the main combustion chamber into which cooling air used to cool a stage that is arranged upstream of the second combustion chamber is fed, wherein the second combustion chamber has a closed cooling system into which the cooling air used to cool a stage of the gas turbine which is arranged upstream of the second combustion chamber is fed and wherein the cooling air which is used to cool a stage of the gas turbine which is arranged downstream of the second combustion chamber is additionally fed into the closed cooling system and wherein the stage which is arranged downstream of the second combustion chamber is supplied with cooling air by an overflow line which is in communication with the stage arranged upstream of the second combustion chamber.

5. The gas turbine as claimed in claim 4, wherein the second combustion chamber opens into the main gas passage downstream of a stage arranged upstream of the second combustion chamber and upstream of a stage arranged downstream of the second combustion chamber.

6. The gas turbine as claimed in claim 4, wherein the second combustion chamber is arranged between partition walls which separate the second combustion chamber from adjoining regions of the turbine in which gas pressure which has been generated by compressors prevails.

7. A gas turbine, comprising a main combustion chamber, a cooling system for air cooling of at least one guide vane and guide ring of the gas turbine and/or a main gas passage, and a non-reheating second combustion chamber arranged downstream of the main combustion chamber, the second combustion chamber adapted to accept cooling air to cool a stage of the gas turbine which is arranged upstream of the second combustion chamber, whereby the accepted cooling air is used for cooling and feeding the combustion of the second combustion chamber, and whereby the second combustion chamber has an exit which opens into the main gas passage.

8. A gas turbine adapted for use in a land-based power generation system, comprising:

a main combustion chamber;

a plurality of stages, each stage having a plurality of guide vanes and guide rings;

a cooling system for air cooling at least some of the guide vanes and guide rings and/or a main gas passage; and a non-reheating second combustion chamber arranged downstream of the main combustion chamber into which cooling air used to cool a stage that is arranged upstream of the second combustion chamber is fed, whereby the cooling air is used for cooling and feeding the combustion of the second combustion chamber and whereby the second combustion chamber has an exit which opens into the main gas passage.

\* \* \* \* \*